United States Patent
Boisvert et al.

(10) Patent No.: US 10,785,343 B2
(45) Date of Patent: Sep. 22, 2020

(54) LEVERAGING HISTORIC ONLINE TRAFFIC TO IDENTIFY CANDIDATE ENTITIES FOR CONTENT DELIVERY

(71) Applicant: Microsoft Technology Licensing, LLC, Redmond, WA (US)

(72) Inventors: Alex Boisvert, Novato, CA (US);
Darren Lee, Moraga, CA (US);
Matthew Heller, Omaha, NE (US);
Stephen Haberman, Omaha, NE (US);
Nitin Julka, Alameda, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 15/224,553

(22) Filed: Jul. 31, 2016

(65) Prior Publication Data
US 2018/0034939 A1 Feb. 1, 2018

(51) Int. Cl.
*H04L 29/08* (2006.01)
(52) U.S. Cl.
CPC ............ *H04L 67/306* (2013.01); *H04L 67/02* (2013.01); *H04L 67/20* (2013.01); *H04L 67/22* (2013.01)
(58) Field of Classification Search
CPC ....... H04L 67/306; H04L 67/02; H04L 67/20; H04L 67/22
USPC ......................................................... 709/219
See application file for complete search history.

(56) References Cited

U.S. PATENT DOCUMENTS

| | | | | |
|---|---|---|---|---|
| 10,026,102 | B2* | 7/2018 | Mihalik | G06Q 30/0269 |
| 2011/0153413 | A1* | 6/2011 | Chunilal | G06F 17/30867 |
| | | | | 705/14.42 |
| 2011/0153422 | A1* | 6/2011 | Cousins | G06Q 30/02 |
| | | | | 705/14.53 |
| 2013/0246609 | A1* | 9/2013 | Topchy | G06F 16/957 |
| | | | | 709/224 |
| 2016/0162924 | A1* | 6/2016 | Rathod | G06Q 30/0217 |
| | | | | 705/14.19 |
| 2016/0227297 | A1* | 8/2016 | Bennett | H04N 21/812 |
| 2016/0283971 | A1* | 9/2016 | Ernster | G06Q 30/0244 |
| 2017/0193547 | A1* | 7/2017 | Berrett | G06Q 30/0244 |

* cited by examiner

*Primary Examiner* — Joseph L Greene
(74) *Attorney, Agent, or Firm* — Hickman Palermo Becker Bingham LLP; Daniel D. Ledesma

(57) ABSTRACT

A system for transmitting electronic content over a computer network is provided. In one technique, client devices that visit a website send, to a content delivery service, interaction data that indicates that the client devices interacted with the website. Later, a content provider of the website creates a content delivery campaign with the service or establishes (or renews) a retargeting segment for an existing campaign. The content delivery campaign indicates that certain content is to be delivered to entities who have interacted with the content provider, such as by visiting the website. The content delivery service uses the interaction data to identify candidate entities who satisfy targeting criteria of the retargeting segment. If a candidate entity does satisfy the targeting criteria, then the candidate entity is added to the retargeting segment, even though the candidate entity may not have interacted with the website after the retargeting segment was created or renewed.

16 Claims, 3 Drawing Sheets

LEVERAGING HISTORIC ONLINE TRAFFIC TO IDENTIFY CANDIDATE ENTITIES FOR CONTENT DELIVERY

TECHNICAL FIELD

The present disclosure relates to electronic data processing, electronic content delivery, and, more particularly, to identifying candidate entities for content delivery at time of campaign creation. SUGGESTED ART UNIT: 2447. SUGGESTED CLASSIFICATION: 709/200.

BACKGROUND

The Internet allows end-users operating computing devices to request content from many different content providers. Some content providers desire to send additional content items to users who visit their respective websites or who otherwise interact with the content providers. To do so, content providers may rely on a content delivery service that delivers the additional content items to computing devices of such users. In one approach, a content provider provides, to the content delivery service, data that indicates one or more user attributes that users must satisfy in order to receive the additional content items. The content delivery service creates a content delivery campaign that includes the data and is intended for sending additional content items to computing devices of users who will visit a website of the content provider. However, at the time of campaign creation, such a set of users is zero. Also, for privacy reasons, the content delivery service may not commence the content delivery campaign until the number of users in the set is above a particular threshold, such as five thousand. Otherwise, the content delivery campaign may be able to target specific users whose identities may be deduced.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for populating a retargeting segment based on historic online traffic. In one technique, client devices that visit a content provider's website send, to a content delivery service, interaction data that indicates that the client devices interacted with the website. Later, the content provider (or an affiliate) creates a content delivery campaign with the content delivery service or establishes (or renews) a retargeting segment for an existing content delivery campaign. The content delivery campaign indicates that certain content is to be delivered to entities (e.g., users or client devices) who have interacted with the content provider, such as by visiting a website of the content provider. The content delivery service uses the interaction data to identify candidate entities who satisfy targeting criteria of the retargeting segment. If a candidate entity does satisfy the targeting criteria, then the candidate entity is added to the retargeting segment, even though the candidate entity may not have interacted with the website after the retargeting segment was created or renewed.

System Overview

Figure 1:
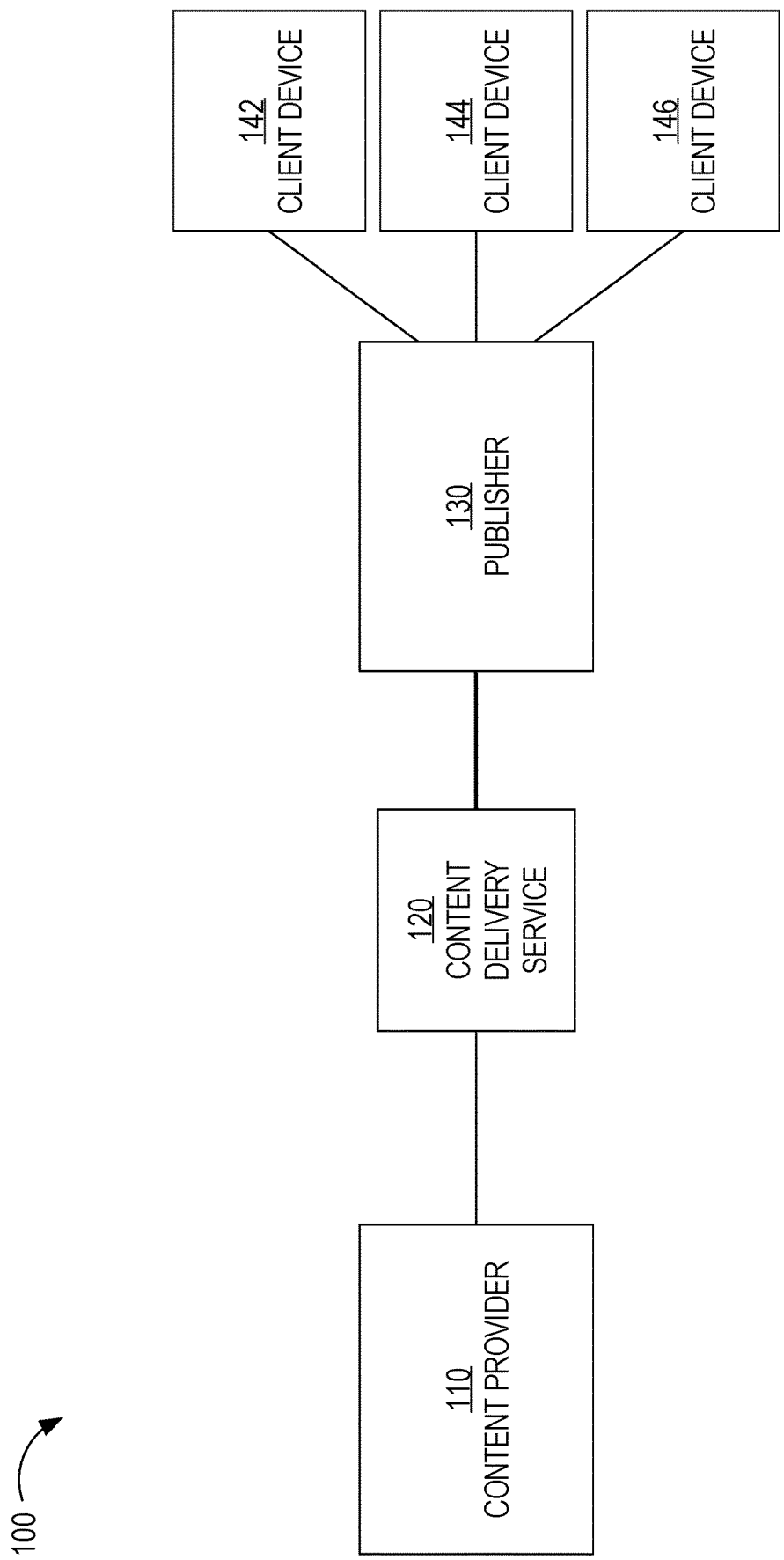
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes a content provider 110, a content delivery service 120, a publisher 130, and client devices 142-146. Although one content provider is depicted, system 100 may include more content providers. Similarly, system 100 may include more than one publisher and more or less client devices.

Content provider 110 interacts with content delivery service 120 (e.g., over a network, such as a LAN, WAN, or the Internet) to enable content items to be presented, though publisher 130, to end-users operating client devices 142-146. Thus, content provider 110 provides one or more content items to content delivery service 120, which in turn selects content items to provide through publisher 130 for presentation to users of client devices 142-146. However, at the time that content provider 110 registers with content delivery service 120, neither party may know which end-users or client devices will receive content items from content provider 110.

Content provider 110 also provides (e.g., owns or manages) a web site that contains content that client devices 142-146 may request. The web site may be hosted by one or more (e.g., web) servers and may comprise multiple web pages. The web pages may contain (individually or collectively) information about a product or service and a form for end-users to fill in information, such as a name and/or contact information (e.g., email address, phone number, and/or mailing address of the web site visitor).

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery service 120.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery service 120. That request is sent (over a network, such as a LAN, WAN, or the Internet) by publisher 130 or by the client device that requested the original content from publisher 130. For example, a web page that the client device renders includes one or more calls (or HTTP requests) to content delivery service 120 for one or more content items. In response, content delivery service 120 provides, over a network, one or more particular content items to the client device directly or through publisher 130. In this way, the one or more particular content items may be presented (e.g., displayed) concurrently with the content requested by the client device from publisher 130.

A content item may comprise an image, a video, audio, text, graphics, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones. A client device may execute (a) a web browser into which an end-user may enter a URL associated with content provider 110 or (b) a software application that is provided by, and is configured to communicate only with, content provider 110.

Content Delivery Campaigns

Content provider 110 establishes a content delivery campaign with content delivery service 120 by providing data (e.g., through a web portal provided by content delivery service 120) that specifies attributes of the content delivery campaign. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2016 to Aug. 1, 2016, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of a publisher through which a content item will be presented to a user, etc. Examples of characteristics of a user include demographic information, residence information, job title, employment status, academic degrees earned, academic institutions attended, former employers, current employer, number of connections in a social network, identity of some of those connections, number and type of skills, number of endorsements, and stated interests. Examples of attributes of a computing device include type of device (e.g., smartphone, tablet, desktop, laptop), operating system type and version, and size of screen.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery service 120 receives, from a computing device or a publisher, a request that does not satisfy any (or all) of the targeting criteria, then content delivery service 120 ensures that any content items associated with the particular content delivery campaign are not sent to the computing device. The strictness of how much of the targeting criteria must be satisfied may be configured for each campaign and, thus, may vary from campaign to campaign.

Instead of one set of targeting criteria, the same content delivery campaign may be associated with multiple sets of targeting criteria. For example, one set of targeting criteria may be used during one period of time (e.g., during certain hours of a weekday or only weekends) of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 (and/or the corresponding device/user) may not satisfy targeting criteria of one content item of a campaign, the same content request (and/or the corresponding device/user) may satisfy targeting criteria of another content item of the campaign.

Different content delivery campaigns that content delivery service 120 manages may have different compensation schemes. For example, one content delivery campaign may compensate content delivery service 120 for each presentation of a content item from the content delivery campaign (referred to herein as cost per impression or CPM). Another content delivery campaign may compensate content delivery service 120 for each time a user interacts with a content item from the content delivery campaign, such as selecting or clicking on the content item (referred to herein as cost per click or CPC). Another content delivery campaign may compensate content delivery service 120 for each time a user performs a particular action, such as purchasing a product or service, downloading a software application, or filling out a form (referred to herein as cost per action or CPA). Content delivery service 120 may manage only campaigns that are of the same type of compensation scheme or campaigns that are of any combination of the three types of compensation scheme.

Recording Pre-Campaign Traffic

As noted herein, a content provider may desire to send content items to entities (e.g., users or client devices) who have already interacted with the content provider (or an affiliate), such as those who have visited a web site provided by the content provider, purchased a product from the content provider, or filled out a physical or electronic form provided by the content provider. This is referred to herein as "retargeting." (There are some situations where the owner or provider of the web site is different than the owner or provider of the corresponding campaign, such as in cases where a third-party (e.g., ad) agency works on behalf of the web site owner/provider (e.g., an advertiser).) For example, a user operating client device 142, using a web browser, visits a website provided by content provider 110. The web browser requests content (e.g., in the form of an HTTP request) from a web server that hosts the web site. Later, content provider 110 then causes (whether directly or indirectly through another party) content items (e.g., advertisements) to be transmitted to client device 142.

In an embodiment, historic online traffic is used to deliver content items associated with a content provider to users associated with one or more retargeting segments. Historic online traffic is online traffic that occurred prior to content provider 110 establishing, with content delivery service 120, a content delivery campaign.

In an embodiment, content provider 110 includes executable code in content that client devices 142-146 may request from a web site provided by content provider 110. The executable code is referred to herein as an "insight tag." The insight tag may be provided by content delivery service 120. A user or representative of content provider 110 adds the insight tag to one or more web pages of the web site. When an insight tag is downloaded to a client device, the client device (or a web browser executing on the client device) executes the insight tag, which causes the client device (or the web browser) to transmit data to content delivery service 120. The data may include a user identifier that identifies, to content delivery service 120, a user of the client device. An example of a user identifier is a member identifier identifying a member of a social network. The data may also include an IP address of the client device, a MAC address of the client device, a date and/or time of day of the download of the insight tag, a content identifier (e.g., a URL) identifying the content (e.g., a web page) that includes the insight tag, and/or any actions that the user performed relative to the requested content, such as filling out a form reflected in the requested content or watching a video that is part of the requested content. One or more of these data items (e.g., such as member identifier) may be encrypted at the client device to ensure privacy.

Once an insight tag is inserted in content provided by content provider 110, online traffic that requests the content will cause content delivery service 120 to collect information about the requests from various client devices, all before a content delivery campaign that will be (or has been) initiated by content provider 110 commences.

Example Process

Figure 2:
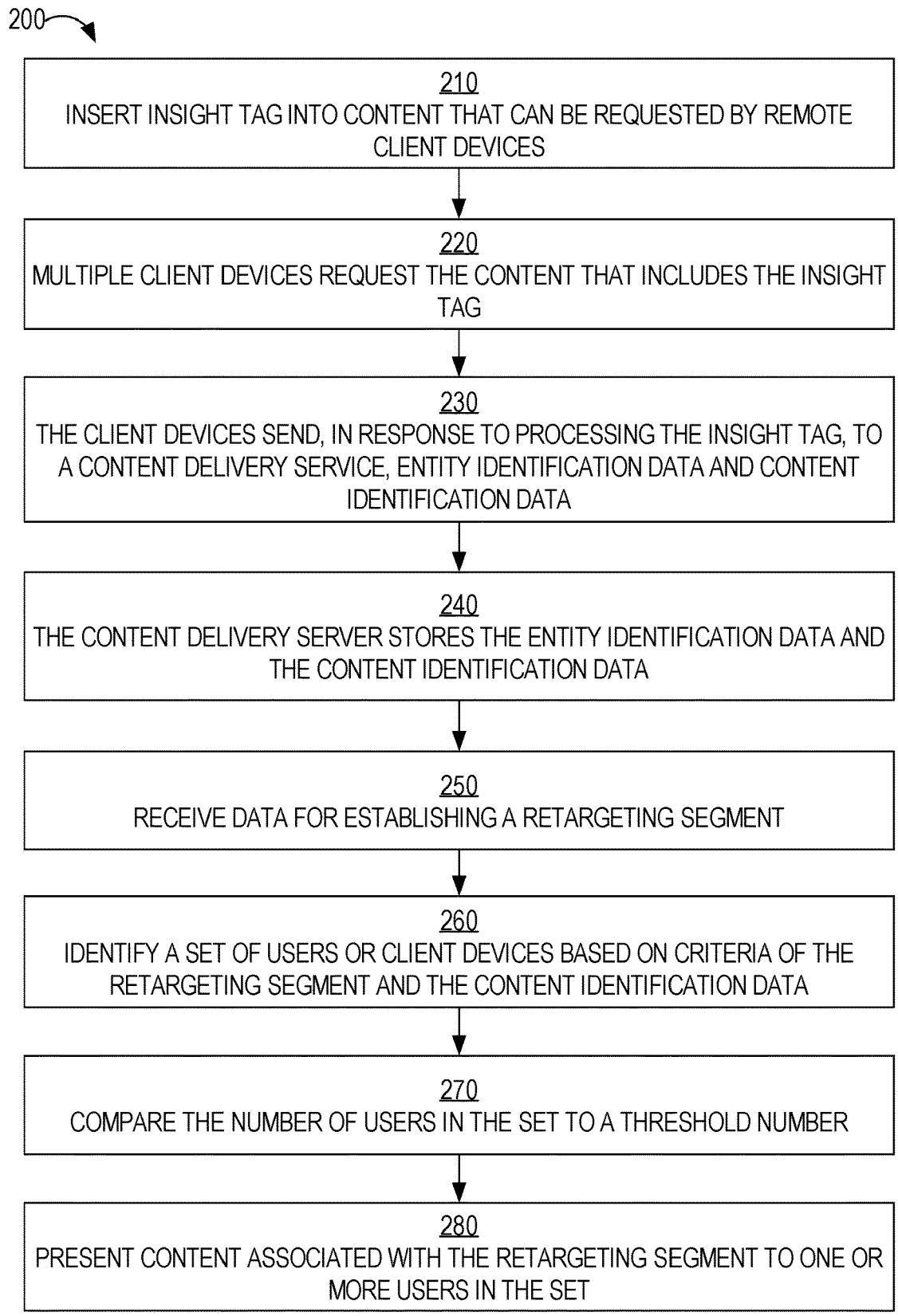
FIG. 2 is a flow diagram that depicts a process for using historic online traffic to populate a retargeting segment, in an embodiment.

FIG. 2 is a flow diagram that depicts a process 200 for using historic online traffic to populate a retargeting segment, in an embodiment. Process 200 may be implemented by different parties, such as content provider 110, content delivery service 120, and client devices 142-146.

At block 210, an insight tag is inserted into content that can be requested by remote client devices. The content may be web content, such as a web page or a media file, such as an audio file or video file. Block 210 may involve content provider 110 (or a representative or agent thereof) copying and pasting the insight tag into the content. Content provider 110 may have received the insight tag from content delivery service 120 using electronic means, such as receiving an email with the insight tag included or displaying a web page that includes the insight tag and that is provided by content delivery service 120.

At block 220, multiple client devices request content that includes the insight tag. Block 220 may involve the client devices sending HTTP requests to web pages that include the insight tag and that are hosted by content provider 110. Block 220 may be performed continuously while the other blocks in process 200 are performed.

At block 230, in response to the client devices processing or executing the insight tag, the client devices send, to content delivery service 120, entity identification data and content identification data. Each instance of entity identification data includes an identifier that uniquely identifies an entity, such as a user of the client device or the client device itself, which generates the instance. Examples of identifiers include a user or member identifier established by a web service (e.g., a social network service, such as LinkedIn, Facebook, or Google+), an IP address, and a MAC address.

Each instance of content identification data includes an identifier that uniquely identifies the content that the client device requested. Examples of the identifier include a URI, a URL, a name of the website that originated the requested content, a name of the provider of the requested content, a content ID, and a combination of the above, such as a website name and content ID that is established by the provider.

At block 240, content delivery service 120 stores the entity identification data and the content identification data. Block 240 may involve storing the data in storage, whether volatile or non-volatile, such as a magnetic disk, an optical disk, or a solid-state drive. The data may be stored in a file system or a database under any data model, such as a relational model, object-relational model, hierarchical database model, or key-value model. The storage in which the entity identification data and the content identification data is stored may be segregated from other storage that store different types of data. Additional encryption may be applied when storing one or both identification data in order to provide a stronger security/privacy guarantee.

Each instance of entity identification data is mapped to (or stored in association with) the instance of content identification data that accompanied the entity identification data from the same client device.

At block 250, data for establishing a retargeting segment is received. The data may be part of a request that establishes a new content delivery campaign which comprises one or more targeting segments. Alternatively, the data may be part of a request to establish a retargeting segment in an existing content delivery campaign. Alternatively, the data may be part of a request to renew a previously-established retargeting segment. For example, a retargeting segment was established at time A and its associated content delivery campaign ended at time B. Later, at time C, a user or representative of a content provider provides data to renew the retargeting segment, effectively renewing the content delivery campaign.

The data for establishing the retargeting segment includes one or more criteria that defines the retargeting segment, such as one or more attributes of users (female C-level executives), one or more attributes of the users' client devices (must be a handheld device running iOS), one or more time restrictions (e.g., only target during working hours), and one or more geographic restrictions (e.g., anywhere outside the United States).

The data for establishing a retargeting segment may also include content identification data that indicates which content (e.g., web page) must be requested or visited in order for a user (or client device) to be part of the retargeting segment. For example, the content identification data may include (a) a URL of a web page or (b) a combination of name or identifier of a content provider and a content ID. Thus, if a user visited web page A prior to establishment of a retargeting segment and the user satisfies all the criteria of the retargeting segment, but the retargeting segment is only for users who visited web page B, then the particular user will not be part of the retargeting segment, unless the retargeting segment is updated to include users who visited web page A.

At block 260, a set of users or client devices is identified. Block 260 involves using information retrieved from insight tags and comparing that information to criteria associated with the retargeting segment. For example, each entity identification data-content identification data pair from the insight tags is analyzed to determine whether the content and, optionally, the user associated with that pair satisfy the appropriate criteria of the retargeting segment. For example, a criterion of a retargeting segment may be that a user must visit a particular webpage. If content identification data of a data pair indicates the particular webpage, then the user may be a candidate for inclusion in the retargeting segment (or the set of users).

The data from the insight tags may be organized so that not all pairs need to be considered. For example, pairs may be organized based on content provider such as pairs involving content provider A are separated from pairs involving content provider B. As another example, an index may be built upon the pair data, where a key of the index is a criterion of the retargeting segment, such as content provider, geography, type of client device, etc.

If a retargeting segment is associated with user criteria, then entity identification data of a pair is used to identify an identifier (e.g., a member identifier) and that identifier is used to look up, in a database, information about a user or member associated with the identifier. For example, if content delivery service 120 is affiliated with a social network service that maintains data about registered users and social connections between the registered users, then content delivery service 120 transmits, to the social network service, a request (for user profile data) that includes the identifier. The social network service returns, in response to the request, a user profile that is associated with the identifier. Data contained within the user profile may have been specified (entirely or at least partially) by the corresponding user when that user interacted with the social network provider at registration time and/or sometime thereafter. Some of the data contained within the user profile may have been derived by the social network service. (The social network service may be remote relative to content delivery service 120. Alternatively, the social network service may be hosted by the same data center that hosts content delivery service 120.)

Content delivery service 120 then determines whether data contained within the user profile satisfies (wholly or in part) the user criteria of the retargeting segment. If so, then the user (or the identifier used to perform the lookup) or the entity identification data is added to the retargeting segment.

At the end of block 260, multiple users indicated in the data from the insight tags may be identified. Thus, the retargeting segment may be effectively pre-populated, i.e., before the retargeting segment is active or before the corresponding content delivery campaign commences or is renewed. However, block 260 may involve identifying a number of users or client devices that do not satisfy the criteria of a retargeting segment, for whatever reason, such as not having the right user attributes, not having the right device attributes, and not being associated with the right requested content.

At block 270, the number of users or client devices in the set identified in block 260 is compared to a threshold number, such as 1,000. If the number of users or client devices is less than the threshold number, then the content delivery campaign with respect to the retargeting segment is postponed until the number is greater than or equal to the threshold number. Block 270 is optional and may be implemented to further bolster user privacy. If there was no threshold or the threshold was really small, then content providers could define targeting segments so narrowly (e.g., CEOs of companies worth over 50 billion dollars) that they could target a single user or a select few.

At block 280, content associated with the content delivery campaign is presented to one or more users or client devices in the set. Block 280 may occur each time content delivery service 120 receives a content request that involves a user or client device in the set. For example, content delivery service 120 receives, from publisher 130, a content request that indicates a user or client device. If the particular user or client device is in a retargeting segment, then content delivery service 120 sends, to the user or client device, content (e.g., an advertisement) associated with the retargeting segment.

In a related embodiment, process 200 does not involve a retargeting segment that has specified user criteria. Thus, content delivery service 120 may only rely on an entity identification data-content identification data pair to determine whether content associated with a retargeting segment is identified in the pair. If so, then the corresponding entity identification data (e.g., an IP address or a member identifier) is used to send content associated with the content delivery campaign (as described in block 280) to the appropriate client device.

A benefit of the above approach is that a retargeting segment may be targeted much sooner than under a previous approach that did not take historic online traffic into account. For example, the previous approach may need to wait one month before targeting a segment, effectively postponing a content delivery campaign. In contrast, the above approach may allow the segment to be targeted either (a) immediately upon creation of the retargeting segment or of the content delivery campaign or (b) at least much sooner than the previous approach.

Age Limit

In an embodiment, retargeting segments have an age limit that dictates which entities (i.e., users or client devices) may be retargeted. For example, a default (system) setting of 90 days may apply to all retargeting segments managed by content delivery service 120. If an entity has been assigned to a retargeting segment for more than 90 days, then that entity is removed from the retargeting segment. As another example, each retargeting segment that content delivery service 120 manages may have a different age limit. In that case, such a limit may be specified by the corresponding campaign owner or the content provider that initiated the corresponding campaign. An age limit allows content providers to only retarget entities (or users) for a limited amount of time, since retargeting is most effective when the visit (that triggered the entity being assigned to the retargeting segment) was recent and fresh.

An age limit may delay when block 270 results in the affirmative. For example, if the threshold is 500 and at time T1 the size of a retargeting segment is 495. As time progresses, 10 entities may be removed from the retargeting segment due to an age limit of the retargeting segment after which six entities are added. If the 10 entities were not removed, then the retargeting segment would be activated.

In an embodiment, an age limit of a retargeting segment causes entities to no longer be assigned to the retargeting segment without causing the corresponding campaign to stop or pause, even if the size of the retargeting segment is below a defined threshold (if one exists). In an alternative embodiment, an age limit can cause the corresponding campaign (which has commenced) to stop or pause if the size of the retargeting segment falls below the threshold.

If a retargeting segment has an age limit, then block 260 may involve analyzing time data associated with an identification data-pair to determine whether the difference between the current date/time and the date/time of the pair is less than the age limit. If so, then the associated entity is added to the retargeting segment. Otherwise, the entity is not.

Use Cases

There are at least two use cases of pre-populating a retargeting segment. In one use case, content provider 110 inserts one or more insight tags into its content prior to establishing a retargeting segment with content delivery service 120. For example, a representative of content provider 110 inserts an insight tag into each of three web pages of a website that the content provider 110 hosts. Immediately after inserting the insight tags, client devices 142-146 download the insight tags after visiting one of the three web pages. In response, content delivery service 120 receives, from client devices 142-146, data about users of client devices 142-146 and the requested content. One week later, a representative of content provider 110 establishes a retargeting segment with content delivery service 120 by, for example, providing data to a web site that is provided by content delivery service 120 and through which other content providers may interact to establish content delivery campaigns. When the retargeting segment is established, content delivery service 120 analyzes the data received from client devices 142-146 to determine whether the respective users are to be assigned to the retargeting segment. In a similar example, insight tags are inserted into content before content provider 110 is ready to sign a contract with content delivery service 120 or the corresponding content delivery campaign is ready to launch, which may be timed for the following fiscal quarter.

In another user case, content provider 110 is an existing partner or customer and desires to create a new segment. Thus, insight tags may have been inserted into content provided by content provider 110 for a significant amount of time.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
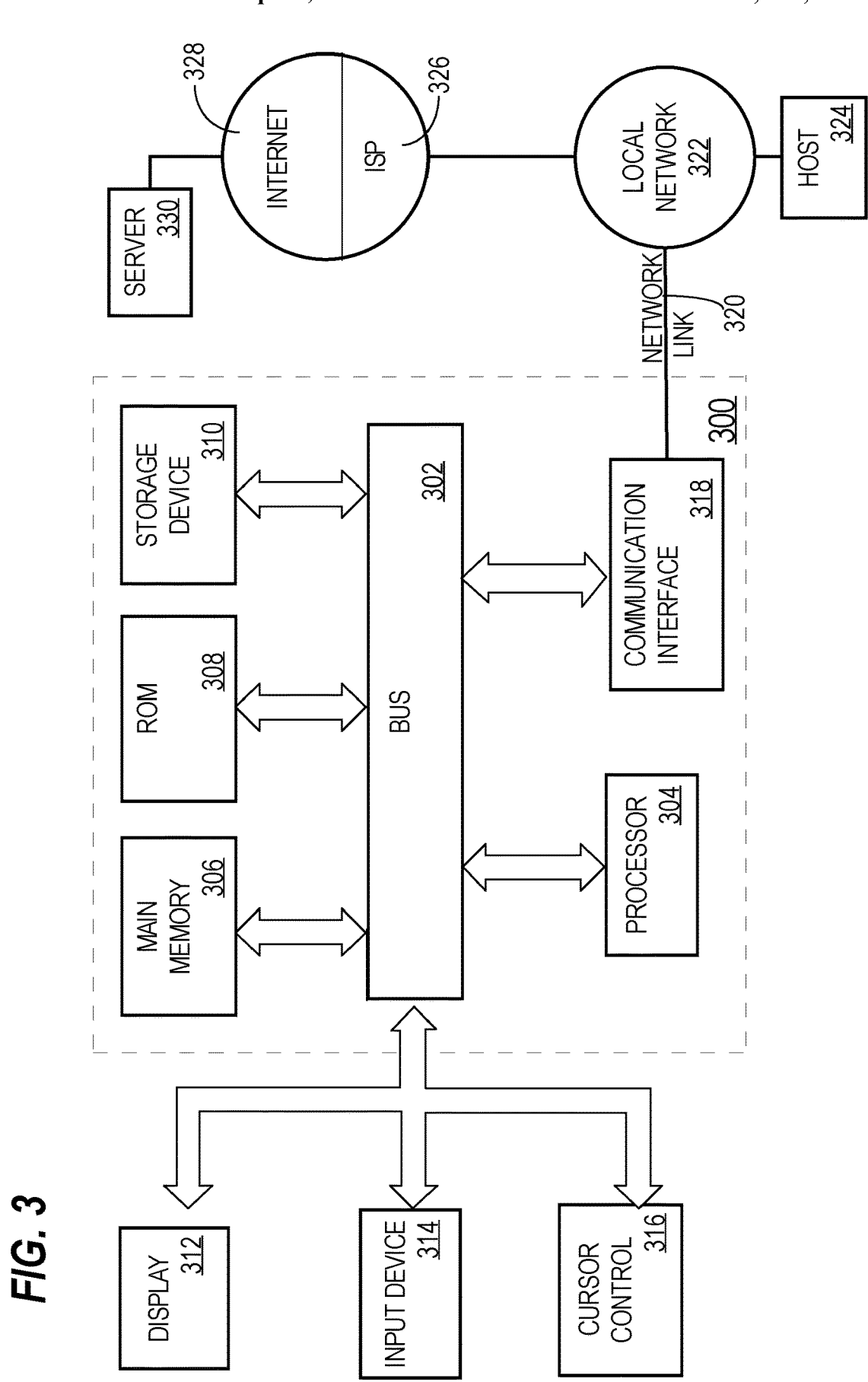
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A content delivery system for creating and activating retargeting content delivery campaigns, wherein a retargeting content delivery campaign is a content delivery campaign that is initiated by a content provider and that targets one or more content items to entities that have already had an online interaction with the content provider or an affiliate of the content provider, the content delivery system comprising:

one or more processors;

one or more storage media storing instructions which, when executed by the one or more processors, cause:

prior to receiving, by the content delivery system, from the content provider, campaign data for creating the retargeting content delivery campaign:

providing, by the content delivery system, to the content provider, an insight tag that comprises executable code, wherein the content provider includes the insight tag in content provided by the content provider or the affiliate of the content provider;

for each client device of a plurality of client devices:

in response to said each client device processing the insight tag included in the content that was requested by said each client device and that was received from another computer system (a) that is provided by the content provider or the affiliate, (b) that hosts the content, and (c) that is different than the content delivery system, receiving, from said each client device, by the content delivery system, over a network, (1) entity identification data that identifies said each client device or an entity associated with said each client device and (2) content identification data that indicates content retrieved by said each client device;

storing, by the content delivery system, the entity identification data and the content identification data;

after storing the entity identification data and the content identification data of the plurality of client devices, receiving, from the content provider, by the content delivery system, data for creating the retargeting content delivery campaign and for establishing a retargeting segment associated with the retargeting content delivery campaign, wherein the data includes one or more criteria;

in response to receiving the data, identifying, by the content delivery system, for the retargeting segment of the retargeting content delivery campaign, a set of entities that satisfy the one or more criteria, wherein identifying the set of entities comprises:
identifying a plurality of entities based on the entity identification data and the content identification data of the plurality of client devices;
for each entity of the plurality of entities:
using the entity identification data of said each entity to identify profile data associated with said each entity;
determining, by the content delivery system, whether the profile data associated with the entity satisfies the one or more criteria;

wherein identifying the set of entities comprises, if it is determined that an entity that is associated with said each client device satisfies the one or more criteria, then identifying the entity identification data that is associated with said each client device and storing the entity identification data in association with the segment;

wherein the set of entities includes multiple entities identified in the entity identification data;

after identifying the set of entities, activating, by the content delivery system, the retargeting segment of the retargeting content delivery campaign;

after activating the retargeting segment, causing, by the content delivery system, content associated with the retargeting content delivery campaign to be transmitted over a computer network to at least a subset of entities in the set of entities;

wherein causing the content associated with the retargeting content delivery campaign to be sent comprises:
receiving, from over a second network, a request that includes particular data that is associated with a particular entity;
in response to receiving the request, determining, based on the particular data, whether the particular entity is associated with the segment;
in response to determining, based on the particular data, that the particular entity is associated with the segment, causing the content associated with the retargeting content delivery campaign to be sent to the particular entity.

2. The system of claim 1, wherein the content comprises one or more web pages of a website hosted by the other computer system.

3. The system of claim 1, wherein using the entity identification data of said each entity to identify profile data associated with said each entity comprises:
sending, to a social networking service, a particular request for entity profile data, wherein the particular request includes an entity identifier of said each entity;

as a response to the particular request for entity profile data, receiving the profile data from the social networking service.

4. The system of claim 1, wherein the instructions, when executed by the one or more processors, further cause:
determining a number of entities in the set of entities;
determining whether the number is greater than a threshold value that is a positive value greater than one;
initiating the retargeting content delivery campaign in response to determining that the number is greater than the threshold value.

5. The system of claim 4, wherein the instructions, when executed by the one or more processors, further cause:
prior to determining that the number is greater than the threshold value, determining that the number is less than the threshold value;
in response to determining that the number is less than the threshold value, determining to not initiate the retargeting content delivery campaign.

6. The system of claim 5, wherein the instructions, when executed by the one or more processors, further cause:
prior to determining that the number is greater than the threshold value,
for each client device of a second plurality of client devices:
receiving, from said each client device, over the network, second entity identification data that identifies an entity associated with said each client device and second content identification data that indicates content retrieved by said each client device;
storing the second entity identification data and the second content identification data;
determining, based on the second entity identification data and the second content identification data stored, whether a corresponding entity satisfies the one or more criteria;
adding, to the set of entities, one or more client devices of the second plurality of client devices or one or more users of the one or more client devices of the second plurality of client devices.

7. The system of claim 1, wherein the instructions, when executed by the one or more processors, further cause:
determining whether the content identification data associated with a particular client device of the plurality of client devices indicates content that is associated with the content provider;
in response to determining that the content identification data associated with the particular client device of the plurality of client devices indicates content that is not associated with the content provider, refraining from including, in the set of entities, an identifier that is associated with the particular client device.

8. The system of claim 1, wherein:
the content identification data associated with a particular client device of the plurality of client devices indicates content that is associated with the content provider;
the instructions, when executed by the one or more processors, further cause:
determining whether an entity associated with the particular client device satisfies the one or more criteria;
in response to determining that the entity associated with the particular client device does not satisfy the one or more criteria, refraining from including, in the set of entities, an identifier that is associated with the entity associated with the particular client device.

9. A method performed by a content delivery system for creating and activating retargeting content delivery campaigns, wherein a retargeting content delivery campaign is a content delivery campaign that is initiated by a content provider and that targets one or more content items to entities that have already had an online interaction with the content provider or an affiliate of the content provider, the method comprising:

prior to receiving, by the content delivery system, from the content provider, campaign data for creating the retargeting content delivery campaign:

providing, by the content delivery system, to the content provider, an insight tag that comprises executable code, wherein the content provider includes the insight tag in content provided by the content provider or the affiliate of the content provider;

for each client device of a plurality of client devices:

in response to said each client device processing the insight tag included in the content that was requested by said each client device and that was received from another computer system (a) that is provided by the content provider or the affiliate, (b) that hosts the content, and (c) that is different than the content delivery system, receiving, from said each client device, by the content delivery system, over a network, (1) entity identification data that identifies said each client device or an entity associated with said each client device and (2) content identification data that indicates content retrieved by said each client device;

storing, by the content delivery system, the entity identification data and the content identification data;

after storing the entity identification data and the content identification data of the plurality of client devices, receiving, from the content provider, by the content delivery system, data for creating the retargeting content delivery campaign and for establishing a retargeting segment associated with the retargeting content delivery campaign, wherein the data includes one or more criteria;

in response to receiving the data, identifying, by the content delivery system, for the retargeting segment of the retargeting content delivery campaign, a set of entities that satisfy the one or more criteria, wherein identifying the set of entities comprises:

identifying a plurality of entities based on the entity identification data and the content identification data of the plurality of client devices;

for each entity of the plurality of entities:

using the entity identification data of said each entity to identify profile data associated with said each entity;

determining, by the content delivery system, whether the profile data associated with the entity satisfies the one or more criteria;

wherein identifying the set of entities comprises, if it is determined that an entity that is associated with said each client device satisfies the one or more criteria, then identifying the entity identification data that is associated with said each client device and storing the entity identification data in association with the segment;

wherein the set of entities includes multiple entities identified in the entity identification data;

after identifying the set of entities, activating, by the content delivery system, the retargeting segment of the retargeting content delivery campaign;

after activating the retargeting segment, causing, by the content delivery system, content associated with the retargeting content delivery campaign to be transmitted over a computer network to at least a subset of entities in the set of entities;

wherein causing the content associated with the retargeting content delivery campaign to be sent comprises:

receiving, from over a second network, a request that includes particular data that is associated with a particular entity;

in response to receiving the request, determining, based on the particular data, whether the particular entity is associated with the segment;

in response to determining, based on the particular data, that the particular entity is associated with the segment, causing the content associated with the content delivery campaign to be sent to the particular entity;

wherein the method is performed by one or more computing devices.

10. The method of claim 9, wherein the content comprises one or more web pages of a website hosted by the other computer system.

11. The method of claim 9, wherein using the entity identification data of said each entity to identify profile data associated with said each entity comprises:

sending, to a social networking service, a particular request for entity profile data, wherein the particular request includes an entity identifier of said each entity;

as a response to the particular request for entity profile data, receiving the profile data from the social networking service.

12. The method of claim 9, further comprising:

determining a number of entities in the set of entities;

determining whether the number is greater than a threshold value that is a positive value greater than one;

initiating the retargeting content delivery campaign in response to determining that the number is greater than the threshold value.

13. The method of claim 12, further comprising:

prior to determining that the number is greater than the threshold value, determining that the number is less than the threshold value;

in response to determining that the number is less than the threshold value, determining to not initiate the retargeting content delivery campaign.

14. The method of claim 13, further comprising:

prior to determining that the number is greater than the threshold value, for each client device of a second plurality of client devices:

receiving, from said each client device, over the network, second entity identification data that identifies an entity associated with said each client device and second content identification data that indicates content retrieved by said each client device;

storing the second entity identification data and the second content identification data;

determining, based on the second entity identification data and the second content identification data stored, whether a corresponding entity satisfies the one or more criteria;

adding, to the set of entities, one or more client devices of the second plurality of client devices or one or more users of the one or more client devices of the second plurality of client devices.

15. The method of claim 9, further comprising:
determining whether the content identification data associated with a particular client device of the plurality of client devices indicates content that is associated with the content provider;
in response to determining that the content identification data associated with the particular client device of the plurality of client devices indicates content that is not associated with the content provider, refraining from including, in the set of entities, an identifier that is associated with the particular client device.

16. The method of claim 9, wherein:
the content identification data associated with a particular client device of the plurality of client devices indicates content that is associated with the content provider;
the method further comprising:
   determining whether an entity associated with the particular client device satisfies the one or more criteria;
   in response to determining that the entity associated with the particular client device does not satisfy the one or more criteria, refraining from including, in the set of entities, an identifier that is associated with the entity associated with the particular client device.

\* \* \* \* \*